(12) United States Patent
Silva

(10) Patent No.: US 7,448,823 B2
(45) Date of Patent: Nov. 11, 2008

(54) QUICK RELEASE SHACKLE PIN SYSTEM

(76) Inventor: Fred Silva, 16142 via Descanso, San Lorenzo, CA (US) 94580

( * ) Notice: Subject to any disclaimer, the term of this patent is extended or adjusted under 35 U.S.C. 154(b) by 285 days.

(21) Appl. No.: 10/954,138

(22) Filed: Sep. 28, 2004

(65) Prior Publication Data

US 2005/0276658 A1     Dec. 15, 2005

Related U.S. Application Data

(60) Provisional application No. 60/578,714, filed on Jun. 9, 2004.

(51) Int. Cl.
*F16G 13/06* (2006.01)
(52) U.S. Cl. .............................. 403/349; 59/85; 59/86; 403/349; 403/325
(58) Field of Classification Search ................ 403/348, 403/349, 323, 325, 327; 411/347, 348; 59/901, 59/85, 86
See application file for complete search history.

(56) References Cited

U.S. PATENT DOCUMENTS

| | | | | |
|---|---|---|---|---|
| 125,744 A | * | 4/1872 | Low .............................. 114/114 |
| 1,002,120 A | | 8/1911 | Berner | |
| 1,184,429 A | | 5/1916 | Davies et al. .................. 278/96 |
| 1,368,117 A | * | 2/1921 | Claude ........................ 278/96 |
| 1,419,974 A | | 6/1922 | McLaughlin | |
| 1,646,546 A | | 10/1927 | Larsen | |
| 1,838,139 A | * | 12/1931 | Fitch ........................ 294/81.51 |
| 2,124,912 A | | 7/1938 | Ehmann | |
| 3,386,137 A | * | 6/1968 | McCarthy ................... 411/347 |
| 4,102,124 A | | 7/1978 | Swager | |
| 4,423,610 A | | 1/1984 | Hart et al. | |
| 4,750,445 A | | 6/1988 | Awalt, Jr. | |
| 4,822,197 A | | 4/1989 | DeMartino et al. | |
| 4,914,903 A | * | 4/1990 | Bernt et al. ..................... 59/86 |
| 5,046,881 A | * | 9/1991 | Swager ....................... 403/154 |
| 5,114,260 A | | 5/1992 | Hart | |
| 5,199,733 A | | 4/1993 | DeLorme | |
| 5,205,693 A | | 4/1993 | Fuller et al. | |
| 5,209,018 A | * | 5/1993 | Heinrich ...................... 49/449 |
| 5,845,898 A | | 12/1998 | Halder et al. | |
| 6,023,927 A | * | 2/2000 | Epstein ........................ 59/86 |
| 6,568,894 B2 | | 5/2003 | Golden et al. | |

FOREIGN PATENT DOCUMENTS

GB     2 221 277 A     1/1990

\* cited by examiner

*Primary Examiner*—Daniel P. Stodola
*Assistant Examiner*—Daniel J. Mills
(74) *Attorney, Agent, or Firm*—John P. O'Banion

(57) ABSTRACT

A spring loaded quick release pin and tubular receiver with a retainer pin configured to secure the quick release pin in a shackle, clevis, yoke or forked rod end. The receiver is welded to a shackle or cast with the shackle as a single body. One end of the quick release pin has aligned J slots that engage the retainer pin positioned in the receiver with a clockwise twist. The other end of the quick release pin has a cap and a spring loaded sleeve that biases the cross pin against outside of the second leg of the shackle. The spring bias keeps the short leg of the J slot engaged with the retaining pin. The quick release pin is removed with a push and counter clockwise twist. The invention includes a kit with a receiver, a bushing and a quick release pin for installing or retrofitting existing shackles.

39 Claims, 5 Drawing Sheets

QUICK RELEASE SHACKLE PIN SYSTEM

CROSS-REFERENCE TO RELATED APPLICATIONS

This application claims priority from U.S. provisional application Ser. No. 60/578,714 filed on Jun. 9, 2004 and is incorporated herein in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to a twist lock pin for a modified shackle, and more particularly to a spring loaded shackle system with a twist lock pin that securely locks into a modified shackle with a combination push and twist.

2. Description of Related Art

A cross bolt shackle is commonly used as a lifting tool in the marine and construction industries for lifting, slinging, securing loads and other purposes. A typical shackle has a U shape forming two legs and has aligned eyes or apertures at the end of each leg. A bolt or pin, usually with a bolt type head at one end, is inserted through the eyes and through an aperture such as a chain link, cable loop, lifting lug, rod end, or the like, positioned between the eyes. Many shackles use one threaded eye to accommodate a mating threaded cross pin. Many others use a hitch pin or cotter pin through the end of the shaft of the cross pin outside the shackle eye.

It is very important that a cross pin does not become unsecured during use from vibration, shaking or jarring. Thus, a variety of securing devices have been developed for shackle cross pins. For example, there are shackles with threaded lock nuts, cam locks or jam blocks to prevent a threaded cross pin from rotating after insertion. There are cross pins that use slots in the shackle eyes and mating protrusions or lugs on a cross pin that must be aligned before insertion and rotated to a secure position. Other devices put slots or keyways in the cross pin and mating protrusions on the shackle eye. Hitch pins with a central actuator and spring loaded ball locks or protrusions on the end are also used for securing shackle cross pins.

Each of these previous solutions has shortcomings, however, especially when using the aforementioned shackle and cross pin combinations in heavy lifting. For example, cross pins with central actuators also have a central bore that weakens the pin making them unsuitable for heavy loads. Cross pins with threads, slots and protrusions are subject to jamming or damage when the shackle and pin are exposed to mud, sand, debris, etc. Shackle and cross pins with mating slots and protrusions and threaded cross pins are particularly susceptible to dents, dings and strikes from hard objects that damage or deforms the threads, slot or protrusion. Further, the slots and protrusions must be aligned before advancing the pin and supporting the load. Another problem with some existing shackles and cross pins is they require two hands to secure and unsecure. This is not suitable for situations where the worker must support a chain or cable in the shackle with one hand and secure the shackle pin with the other. A visual or tactile indication of engagement is inadequate or non-existent on some shackle and pin arrangements. Some shackle systems, including systems with cotter pins or hitch pins in the cross pin, require visual and/or tactile access to both sides of the shackle to secure the pin. Still others have pinch points on the surfaces of the shackle and pin that menace skin, fingers and hands. Many of the complex solutions require several time consuming motions to secure and unsecure, or thread and unthread the cross pin. Still others are not suitable for manipulation and engagement while wearing heavy construction or winter gloves.

What is needed is a shackle and cross pin system that is suitable for heavy loads in adverse construction and marine conditions and can be quickly secured and unsecured with one hand while wearing heavy gloves. A shackle and cross pin system is also needed that minimizes pinch points, has a tactile indication of engagement, and does not require blind side access to the shackle. A system that is inexpensive to manufacture or can be installed or retrofitted on existing shackles is desirable. A shackle and pin system where the pin can partially support a load before engagement is also desirable.

BRIEF SUMMARY OF THE INVENTION

The invention is a spring loaded quick release pin and a tubular receiver with a retainer pin configured to secure the quick release pin in a shackle, clevis, yoke or forked rod end. The receiver is welded to the outside of one leg of a shackle. One end of the quick release pin has aligned J slots that engage the retainer pin positioned in the receiver with a clockwise twist. The other end of the quick release pin has a cap and a spring loaded sleeve that biases the cross pin against outside of the second leg of the shackle. The spring bias keeps the short leg of the J slot engaged with the retaining pin. The quick release pin is removed with a push and counter clockwise twist. The invention includes a kit with a receiver, a bushing and a quick release pin for installing or retrofitting on existing shackles. In another embodiment, the shackle and receiver are manufactured as a single structure, such as a single casting.

One embodiment of the invention is an apparatus for securing a first object with a first aperture to a second object with second and third apertures that comprises an elongated cylindrical pin with distal and proximal ends, a tubular receiver adapted to receive the distal end of the pin, where the receiver is adapted to couple to the second object adjacent to and aligned with the third aperture, a retainer coupled to the receiver, means for engaging the retainer positioned at the distal end of the pin, where the means for engaging the retainer is further positioned within the circumference of the pin. Further, means for biasing the pin is positioned at the proximal end of the pin, where the first aperture of the first object is secured between the second and third apertures of the second object when the pin is positioned in the first the second, and the third apertures, the means for engaging is engaged to the retainer, and the pin is biased against the second object by the means for biasing.

Another aspect of the invention is where the means for engaging the retainer comprises a plurality of retainer slots, positioned in the distal end of said pin, where each retainer slot is configured to form a continuous J slot with a long leg and a short leg, where the long leg of the J slot is aligned longitudinally with the pin, where the long leg of the J slot is open at the distal end of the pin, where the short leg of the J slot is configured to extend partially toward the distal end of the pin, where the J slot is further adapted to engage the retainer, and where the distal end of the pin engages the retainer when the short leg of the J slot is aligned with the retainer and the pin is biased against the second object by the means for biasing.

A still further aspect of the invention is where the distal end of the pin comprises a truncated cone.

Another aspect of the invention is a pin that has a mid proximal position between the distal end and the proximal end, a large diameter from the distal end to the mid proximal position of the pin, and a small diameter less than the large diameter from the mid proximal position to the proximal end of the pin, where an annular shoulder is formed at the mid proximal position of the pin.

A further aspect of the invention is where the means for biasing comprises a tubular sliding sleeve configured to slide on the small diameter of the pin, where the sliding sleeve has distal and proximal ends, the sliding sleeve further with an inner circumference and an outer circumference, where the distal end of the sliding sleeve has a ridge on the inner circumference, where the outer circumference of the sliding sleeve is greater than the inner circumference of the second aperture of the second object, and where the ridge of the sliding sleeve is adapted to engage the annular shoulder of the pin. Further, the means for biasing has a tubular cap with a distal end, a mid proximal position and a proximal end, where the proximal end of the cap is adapted to couple to the proximal end of the pin, where the cap is further adapted to receive the sliding sleeve from the distal end to the mid proximal position of the cap, a spring adapted to fit the small diameter of the pin, where the spring is positioned within the inner circumference of the sliding sleeve, the spring with a distal end and a proximal end, where the distal end of the spring is positioned on the ridge of the sliding sleeve, where the proximal end of the spring is positioned on the mid proximal portion of the tubular cap, and where the spring is configured to bias the sliding sleeve distally on the pin.

A still further aspect of the invention is where the receiver comprises a tubular receiver sleeve with distal and proximal ends, where the receiver sleeve is adapted to align with the third aperture of the second object, and where the proximal end of the receiver sleeve is adapted to couple to the second object.

Another aspect of the invention is where the retainer is a retainer pin positioned perpendicular to and intersecting the longitudinal axis of the receiver sleeve.

A further aspect of the invention is where the proximal end of the receiver sleeve is adapted to be welded to the second object.

A still further aspect of the invention is where the proximal end of the receiver sleeve is adapted to couple within the third aperture of the second object.

An aspect of the invention is where the third aperture of the second object is adapted with female threads, the proximal end of the receiver sleeve has male threads, and where the male threads are adapted to mate to the female threads.

Another embodiment is an apparatus for securing an object with a first aperture that comprises a body with second and third apertures, where the second and third apertures of the body are adapted to align with the first aperture of the object when the object is positioned between the second and third aperture, a tubular receiver where the receiver is configured to align with the third aperture of the body, and a retainer coupled to the receiver. Also, an elongated cylindrical pin, the pin adapted to fit in the second and the third apertures of the body, the pin with distal and proximal ends, means for engaging the retainer positioned at the distal end of the pin, the means for engaging further positioned within the circumference of the pin, means for biasing the pin positioned at the proximal end of the pin, where the first aperture of the object is secured between the second and third aligned apertures of the body when the pin is positioned through the first, the second, and the third apertures, the means for engaging is engaged with the retainer, and the pin is biased against the body by the means for biasing.

Another aspect of the invention is where the receiver is welded to the body.

A further aspect of the invention is where the receiver is adapted to couple within the third aperture of the body.

A still further aspect of the invention is where the third aperture of the body is adapted with female threads, the receiver has male threads, and where the male threads are adapted to mate to the female threads.

A further aspect of the invention is where the receiver and the body are manufactured as a single structure.

Another aspect of the invention is where the body is selected from the group consisting of a shackle, a clevis, a yoke, and a forked rod end.

A still further of the invention is a body having second and third apertures, where the second and third apertures of the body are adapted to align with the first aperture of the object when the object is positioned between the second and third apertures, a tubular receiver coupled to the body, where the receiver is configured to align with the third aperture of the body, a retainer coupled to the receiver, an elongated cylindrical pin, the pin adapted to fit in the second and the third apertures of the body, the pin having distal and proximal ends, a plurality of open ended J shaped slots positioned at the distal end of the pin, the J shaped slots configured to engage the retainer when the pin is advanced distally in the receiver and rotated through an angle of about less than 180 degrees, a spring positioned near the proximal end of the pin, where the first aperture of the object is secured between the second and third apertures of the body when the pin is positioned through the first, second, and third apertures, the J shaped slots are engaged with the retainer in the receiver, and the spring is biased between the proximal end of the pin and the body.

A further aspect is where a bore extends longitudinally and partially through the distal end of the pin, thereby forming a distal tube, and where the plurality of J shaped slots comprises two.

Another aspect of the invention is a sliding sleeve positioned near the proximal end of the pin, where the sliding sleeve is biased against the body by the spring when the J shaped slots are engaged with the retainer.

Another embodiment of the invention is a kit for mounting a pin securing system to an object having first and second apertures, where the kit comprises a tubular receiver with distal and proximal ends, the proximal end of the receiver adapted to couple to the object, the receiver further adapted to align with the second aperture of the object, and a retainer coupled to the receiver. Also, an elongated cylindrical pin, the pin adapted to slidingly fit in the first and second aligned apertures of the object, the pin having distal and proximal ends, a plurality of retainer slots, positioned in the distal end of the pin, where each the retainer slot is configured to form a continuous J slot with a long leg and a short leg, where the long leg of the J slot is aligned longitudinally with the pin, where the long leg of the J slot is open at the distal end of the pin, where the short leg of the J slot is configured to extend partially toward the distal end of the pin, where the J slot is further adapted to engage the retainer. Further, the pin has a mid proximal position between the distal end and the proximal end, the pin with a large diameter from the distal end to the mid proximal position, the pin with a small diameter less than the large diameter extending from the mid proximal position to the proximal end, where an annular shoulder is formed at the mid proximal position of the pin, a tubular sliding sleeve configured to slide on the small diameter of the pin, the sliding sleeve with a distal end and a proximal end, the sliding sleeve further with an inner circumference and an outer circumference, where the outer circumference of the sliding sleeve is greater than the inner circumference of the first aperture of the object, the distal end of the sliding sleeve with a ridge on the inner circumference, the ridge of the sliding sleeve adapted to engage the shoulder of the pin, a tubular cap with a distal end, a mid proximal position and a proximal end, the proximal end of the cap adapted to couple to the proximal end of the pin, the cap further adapted to accommodate the sliding sleeve from the distal end to the mid proximal position of the cap, a spring adapted to fit the small diameter of the pin, the spring positioned within the inner circumference of the sliding sleeve, the spring with a distal end and a proximal end, the distal end of the spring positioned on the ridge of the sliding sleeve, the proximal end of the spring positioned on the mid proximal portion of the tubular cap, where the spring is configured to bias the sliding sleeve distally on the pin, where the distal end of the pin is engaged with the retainer when the short legs of the J slot is aligned with the retainer and the pin is biased against the object, and where the pin is removable from the first and second aligned apertures of the object when the long legs of the J slots in the pin are aligned with the retainer.

Another aspect of the invention is a bushing with an inner circumference and an outer circumference, where the outer circumference of the bushing is adapted to fit tightly within the first aperture, where the inner circumference of the bushing is further adapted to receive the pin, and where the inner circumference of the bushing is further adapted to be smaller than the outer circumference of the slide sleeve.

A further aspect of the invention is where the first aperture of the object is adapted with female threads, the bushing adapted with male threads, and where the male threads are adapted to mate to the female threads.

A still further aspect of the invention is where the second aperture of the object is adapted with female threads, the receiver sleeve is adapted with male threads, and where the male threads are adapted to mate to the female threads.

A further embodiment is in an apparatus with first and second apertures configured to receive a pin, where the improvement comprises a tubular receiver with distal and proximal ends, the proximal end adapted to couple to the apparatus, where the receiver is further adapted to align with the second aperture of the apparatus, a retainer coupled to the receiver, an elongated cylindrical pin, the pin adapted to slidingly fit in the first and second aligned apertures of the apparatus, the pin having distal and proximal ends, a plurality of retainer slots, positioned in the distal end of the pin, where each retainer slot is configured to form a continuous J slot with a long leg and a short leg, where the long leg of the J slot is aligned longitudinally with the pin, where the long leg of the J slot is open at the distal end of the pin, where the short leg of the J slot is configured to extend partially toward the distal end of the pin, where the J slot is further adapted to engage the retainer, the pin further with a mid proximal position between the distal end and the proximal end, the pin with a large diameter from the distal end to the mid proximal position, the pin with a small diameter less than the large diameter extending from the mid proximal position to the proximal end, where an annular shoulder is formed at the mid proximal position of the pin. Also, a tubular sliding sleeve configured to slide on the small diameter of the pin, the sliding sleeve with a distal end and a proximal end, the sliding sleeve further with an inner circumference and an outer circumference, where the outer circumference of the sliding sleeve is greater than the inner circumference of the first aperture, the distal end of the sliding sleeve with a ridge on the inner circumference, the ridge of the sliding sleeve adapted to engage the shoulder of the pin, a tubular cap with a distal end, a mid proximal position and a proximal end, the proximal end of the cap adapted to couple to the proximal end of the pin, the cap further adapted to accommodate the sliding sleeve from the distal end to the mid proximal position of the cap, a spring adapted to fit the small diameter of the pin, the spring positioned within the inner circumference of the sliding sleeve, the spring with a distal end and a proximal end, the distal end of the spring positioned on the ridge of the sliding sleeve, the proximal end of the spring positioned on the mid proximal portion of the tubular cap, where the spring is configured to bias the sliding sleeve distally on the pin, and where the distal end of the pin is engaged with the retainer when the short legs of the J slot is aligned with the retainer and the pin is biased against the apparatus.

Another aspect of the invention is where the improvement further comprises a bushing with an inner circumference and an outer circumference, the outer circumference of the bushing adapted to fit tightly within the first aperture, the inner circumference of the bushing adapted to receive the pin, and the inner circumference of the bushing is further adapted to be smaller than the outer circumference of the slide sleeve.

A further aspect of the invention is in an improvement where the first aperture of the apparatus is adapted with female threads, the bushing having male threads, and where the male threads are adapted to mate to the female threads.

A still further aspect of the invention is where the improvement further comprises a receiver sleeve having distal and proximal ends, where the proximal end of the sleeve is adapted to couple to the apparatus.

Another aspect of the invention is in an apparatus where the improvement is adapted to couple to an apparatus selected from the group consisting of a shackle, a clevis, a yoke, and a forked rod end.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 5. It will be appreciated that the apparatus may vary as to configuration and as to details of the parts, and that the method may vary as to the specific steps and sequence, without departing from the basic concepts as disclosed herein. The present invention is described herein for use with a shackle or a clevis, however it is contemplated for use on yokes, forked rod ends, lifting lugs, pulley blocks, chain hoists or other lifting tools with aligned apertures. The invention may be used with other tools for lifting with a hook, cable loop, chain or rope. The invention is also contemplated in other applications that use a securing pin through aligned apertures such as guy wires, latches, doors, tailgates, hinged ramps, hitches, racks, tow bars, couplers, portable frames and portable support structures.

Figure 1:
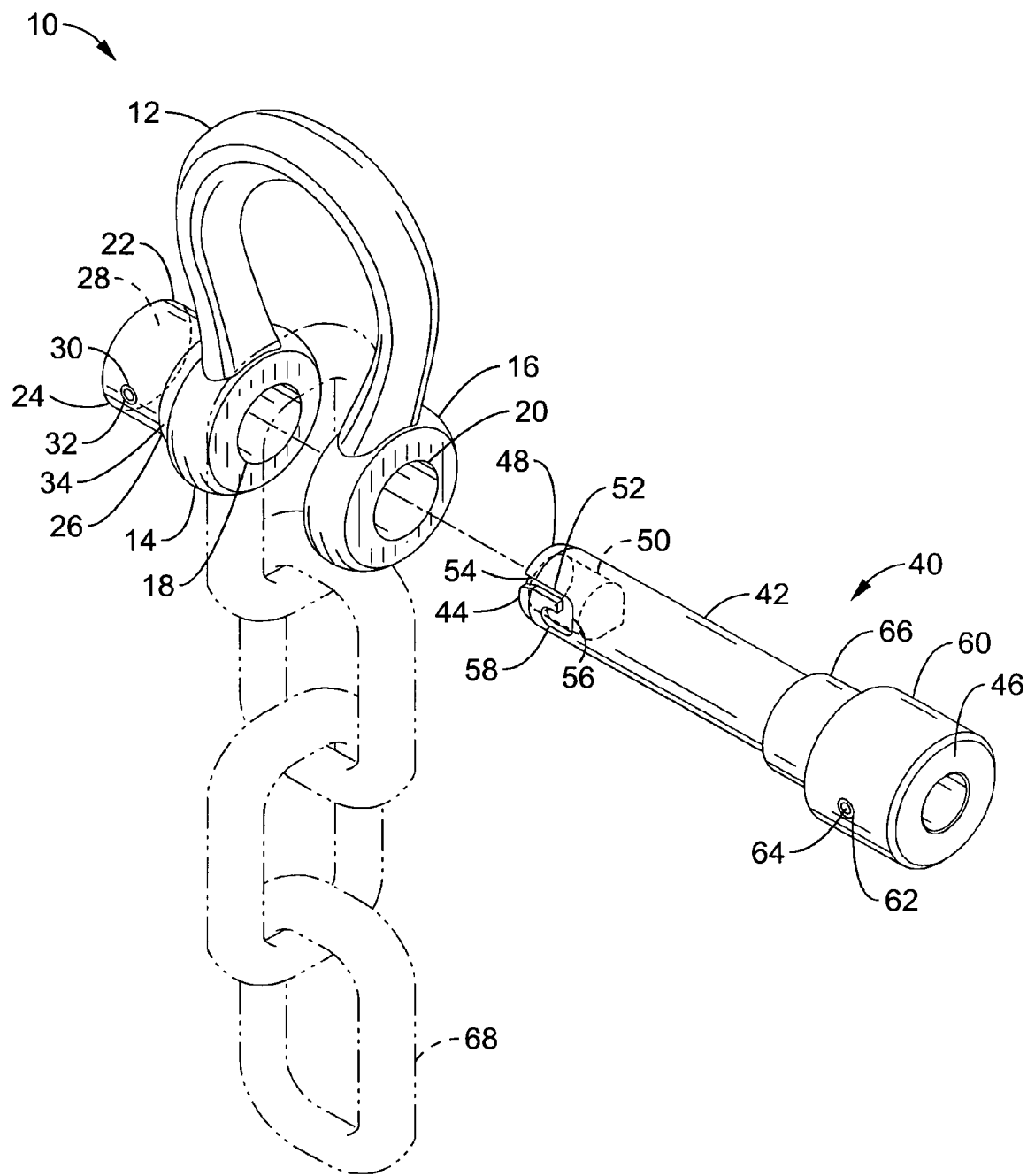
FIG. 1 is a perspective view of a quick release pin shackle system in an unsecured state.

FIG. 1 illustrates a quick release pin shackle system generally designated as 10. Shackle body 12 has left leg 14 and right leg 16, enlarged at the bottom and having left and right apertures 18, 20 respectively for the passage of a pin. In one embodiment, shackle body 12 is a conventional shackle or clevis with unthreaded apertures 18, 20, as are known in the art. A tubular quick release pin receiver 22 is coupled on the outside of left aperture 18 of shackle body 12 and has a distal end 24, a proximal end 26 and inner diameter 28 (see FIG. 3) that corresponds to left aperture 18. Receiver 22 has a pair of roll pin apertures 30 on the circumference (only one shown for clarity) aligned perpendicular to and intersecting the longitudinal axis, and positioned at about the midpoint of receiver 22. A retainer 32, preferably a pin, is shown inserted through apertures 30 and seated tightly. In a preferred embodiment, retainer pin 32 is a roll pin that extends across the diameter of receiver 22. In another embodiment (not shown), retainer 32 is one or more protrusions or lugs extending inward from inside wall of receiver 22. Retainer roll pin 32 can be removed for repair or replacement and, in other embodiments, is a solid pin or a threaded pin. Receiver 22 is aligned with shackle left aperture 18 and coupled to the outside of shackle body 12 with weld 34 or other conventional coupling means as are known in the art. In one beneficial embodiment, shackle body 12, receiver 22 and weld 34 are manufactured as a single structure, such as a single cast body. In a further embodiment (not shown), yokes and forked rod ends are manufactured with a receiver as a single structure or single cast body.

A quick release pin assembly, generally designated as 40, has a cylindrical solid pin body 42 with distal end 44 and proximal end 46. The diameter of pin body 42 is sized to fit in apertures 18, 20 of shackle 12 and aperture 28 of receiver 22. Distal end 44 of pin body 42 has a truncated cone or chamfered circumference 48. Distal end 44 has a cylindrical bore 50 so that distal end 44 of pin body 42 forms a relatively short tube, about the length of receiver 22. A plurality, and preferably two slots 52 (one shown for clarity), aligned with the longitudinal axis of pin body 42, are positioned preferably symmetrically opposite in the wall of the tube formed by cylindrical bore 50 each with a flared opening 54 at distal end 44 and a wider opening 56 at the end of slot 52. The wider opening 56 extends peripherally counter clockwise as seen from proximal end 46, then distally in pin body 42 to form a locking recess 58. This slot configuration can also be described as a continuous J slot with a long leg 52 and a short leg 58. Slots 52 and locking recess 58 are aligned and adapted to accommodate retainer 32 mounted in receiver 22. Receiver 22 is configured to protect distal end 44 of pin body 42 from accidental strikes when inserted and locked in receiver 22.

In another embodiment (not shown), distal end 44 of pin body 42 is solid and one or more long leg 52 and short leg 58 are shallow slots or grooves in the wall of pin body 42 that mate with one or more retainer protrusions or lugs 32 positioned on the inside wall of receiver 22.

Proximal end 46 of pin body 42 has a cylindrical twist cap 60 with two aligned roll pin apertures 62 (one shown for clarity) through the cylindrical wall of twist cap 60. In one embodiment, the surface of twist cap 60 is knurled or otherwise textured for a better grip. Twist cap 60 is secured to pin body 42 with a roll pin 64 that is inserted through pin body 42 and perpendicular to the longitudinal axis of pin body 42 and through pin apertures 62. Roll pin 64 can be a solid pin or a threaded pin and removed for repair or replacement of parts in quick release pin assembly 40. Spring tension sleeve 66 is slidingly coupled to pin body 42 distal of twist cap 60. Details of twist cap 60 and spring tension sleeve 66 are shown in FIG. 3.

In FIG. 1, quick release pin assembly 40 is positioned aligned with shackle apertures 18, 20 and aligned with the aperture of a link of chain 68, shown in phantom.

Figure 2:
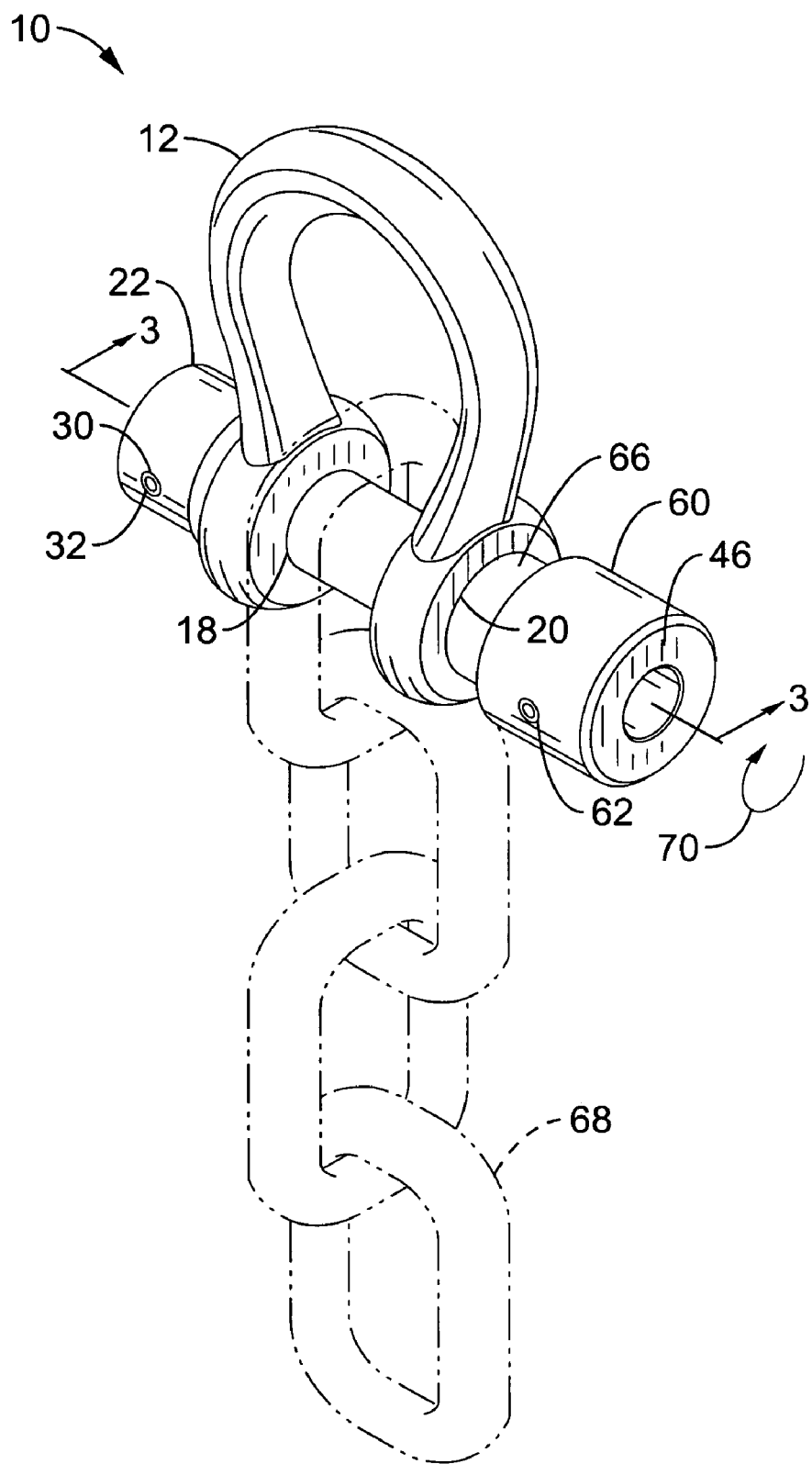
FIG. 2 is a perspective view of the quick release pin shackle system in FIG. 1 in a secured state.
Figure 3:
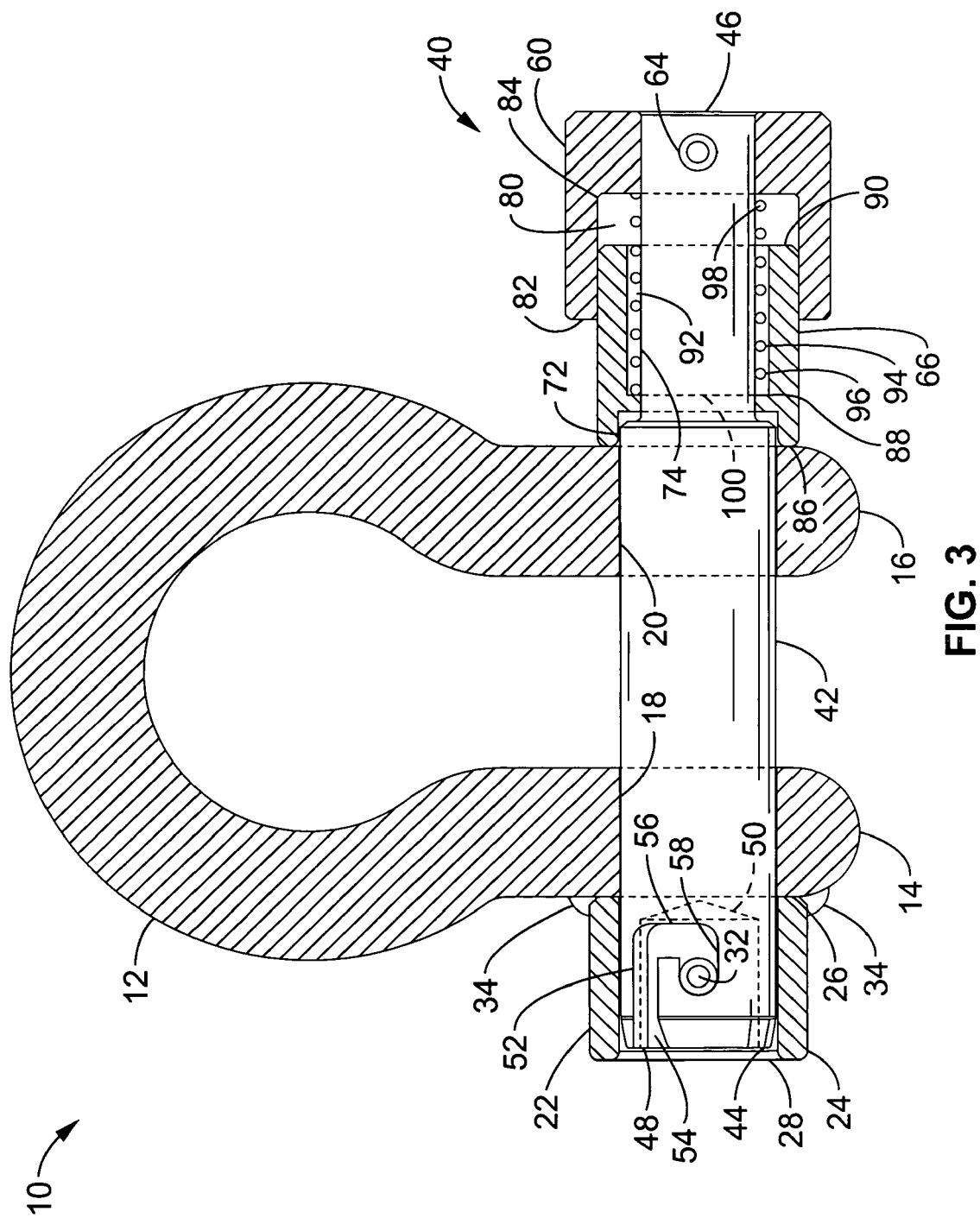
FIG. 3 illustrates a cross section view of the quick release pin shackle system in a secured state as shown in FIG. 2.

FIG. 2. is a perspective view and FIG. 3 is a cross section view taken at line 3-3 in FIG. 2 showing quick release pin assembly 40 inserted through apertures 18, 20 and secured to receiver 22. Pin body 42 is inserted so that slot 52 engages retainer pin 32 in receiver 22 and is pushed distally until wide opening 56 engages retainer pin 32 (shown in FIG. 3). Twist cap 60 is twisted in a clockwise direction, shown by arrow 70 until locking recess 58 engages retainer pin 32. When locking recess 58 has engaged retainer pin 32, quick release pin shackle 10 is configured for lifting of a load on chain 68.

Referring to FIG. 3, shackle 10 and receiver 22 are shown cut away from pin body 42. The J slot farthest away from the viewer at distal end 44 of pin body 42 is not shown for clarity. Proximal end 46 of pin body 42 including twist cap 60 and sliding sleeve 66 are shown in a cutaway view. At the distal end 44 of pin body 42, bore 50 forms a tube. Slot 52, wide opening 56 and locking recess 58 are oriented counter clock wise in the distal end 44 of pin body 42 as seen from the proximal end 46 of pin body 42. Slot 52, wide opening 56 and locking recess 58 are adapted to accommodate retainer pin 32 when rotated through an angle of preferably less than 90 degrees but less than 180 degrees.

Pin body 42 has a mid proximal position 72 with a shoulder that transitions to a reduced, or small diameter 74. Twist cap 60 has a cylindrical bore 80 that accommodates tension sleeve 66 and extends from distal end 82 to a mid proximal position 84. The portion of twist cap 60 from mid proximal position 84 to distal end 46 of pin body 42 is adapted to fit snugly on reduced diameter 74 of pin body 42. Tension sleeve 66 has distal end 86, near distal position 88 and proximal end 90. Tension sleeve 66 has a bore 92 that accommodates a spring 94 on small diameter 74 of pin body 42. Spring 94 is preferably a coil spring and has distal end 96 and proximal end 98. Distal end 96 of spring 94 seats on inner ridge 100 of tension sleeve 66 positioned at near distal position 88. Proximal end 98 of spring 94 seats against mid proximal position 84 of bore 80 in twist cap 60. Tension sleeve 66 is configured to slide on small diameter 74 of pin body 42 and is biased by spring 94 so that ridge 100 rests on the shoulder formed at mid proximal position 72 when pin body 42 is not engaged in receiver 22.

When quick release pin assembly 40 is inserted in receiver 22, twisted clockwise and engaged (locked) as shown in FIG. 2, spring 94 is in a compressed state and exerts a proximal bias against twist cap 60. Distal end 86 of tension sleeve 66 rests on leg 16 at right aperture 20 of shackle body 12 and the bias of spring 94 keeps lock recess 58 engaged with retainer pin 32. In one embodiment, quick release pin assembly 40 is adapted so distal end 44 of pin body 42 is inserted through left aperture 18 before tension sleeve 66 contacts right leg 16 of shackle 12. This allows quick release pin assembly 40 to support chain 68 or other light load temporarily in shackle 12 prior to engagement. In some applications, this allows a worker to shift hand positions or adjust alignment of shackle 12 and chain 68 prior to engagement. Resistance from a quick tug on twist cap 60 provides a positive indication that quick release pin assembly 40 is engaged on retainer pin 32. The axial position of twist cap 60 in relation to right leg 16 with spring 94 in a compressed state is another indication of positive engagement. In one mode, alignment indicators on pin body 42 and shackle 12 provides an indication of positive engagement.

Quick release pin assembly 40 is removed with a slight push distally on twist cap 60 to align wide opening 56 with retainer pin 32, and a short rotation counter clockwise to align slot 52 with retainer pin 32 to disengage pin 42. When quick release pin assembly 40 is disengaged, distal tip 44 of pin body 42 is biased away from receiver 22 by spring 94 as a visible indication that quick release pin assembly 40 is unsecured. In one mode, color coding distal tip 44 of pin body 42 provides a visual indication that quick release pin assembly 40 is in a disengaged state.

In another embodiment (not shown), spring 92 and tension sleeve 66 are not present on quick pin body 42. A spring with a distal end affixed inside distal end 24 of receiver 22 and a proximal end resting against retainer pin 32 is positioned to engage distal end 44 of quick pin 42. In this embodiment, twist cap 60 may also be replaced by another geometric shape such as a key head. Distal end 44 of pin body 42 presses against the spring and keeps pin body 42 in position when retainer pin 32 is engaged in slot 58.

Figure 4:
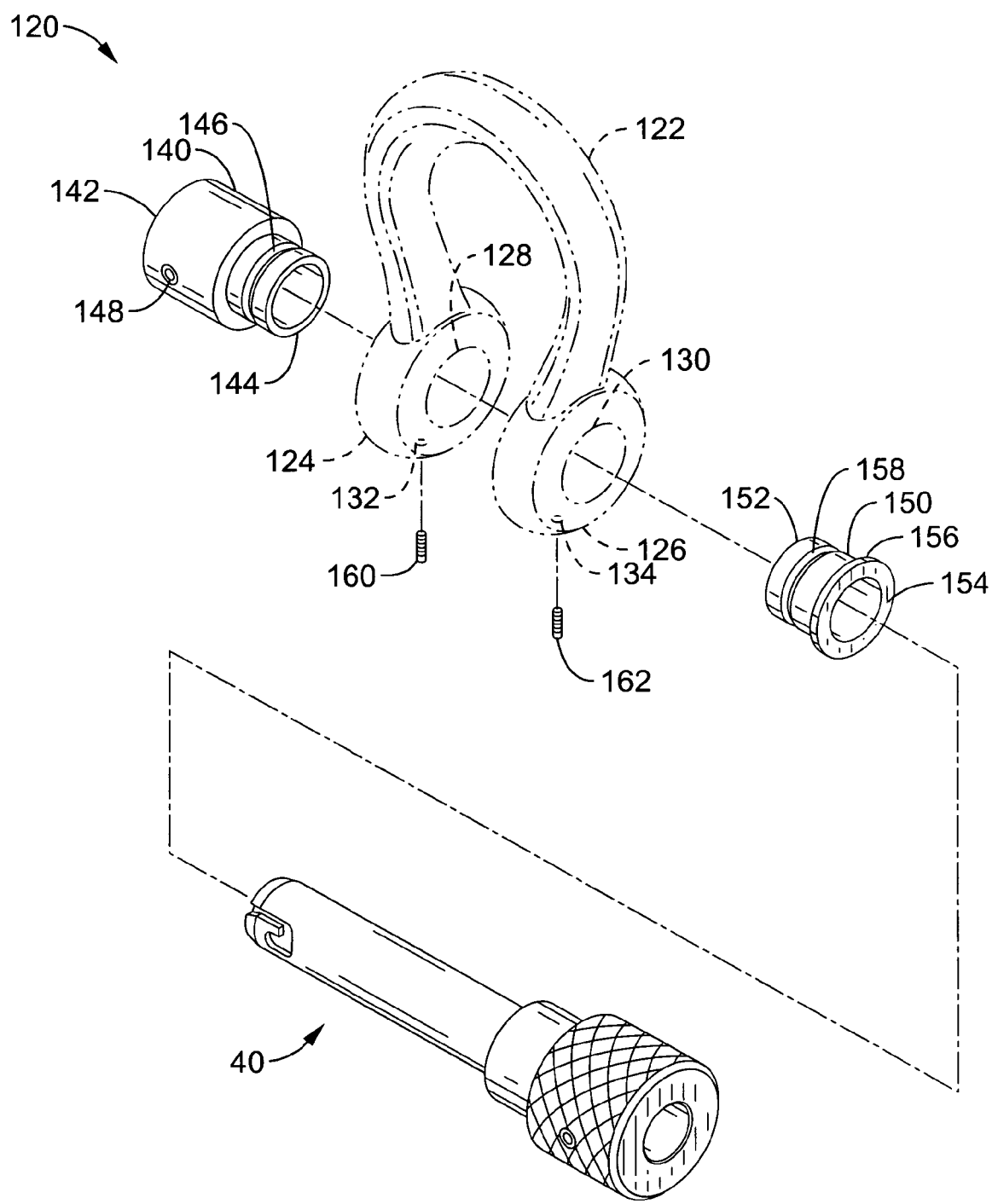
FIG. 4 is a perspective view of a quick release pin, a quick release pin bushing and a quick release pin sleeve in a kit for installing or retrofitting on a common shackle.
Figure 5:
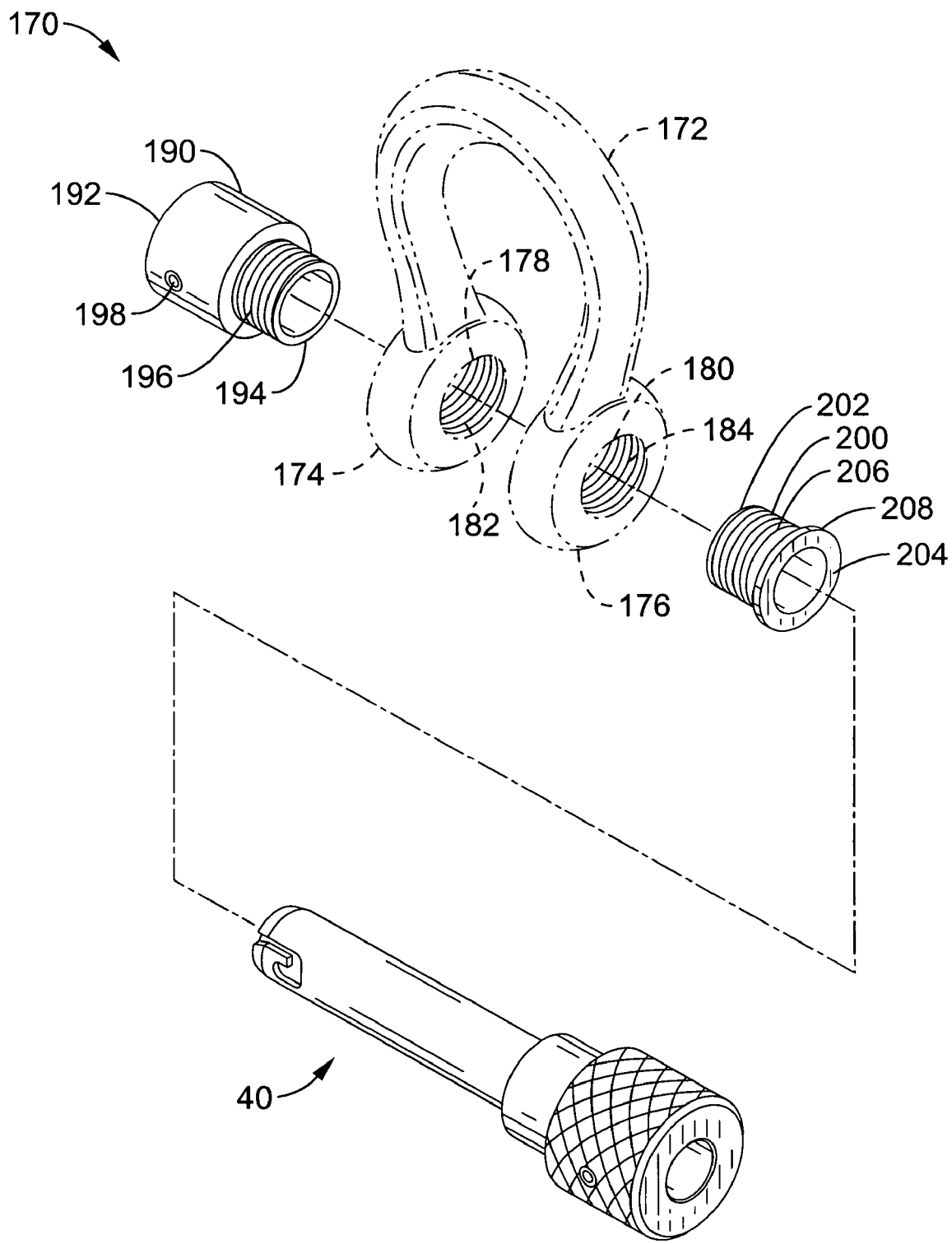
FIG. 5 is a perspective view of a quick release pin, a threaded quick release pin bushing and a threaded quick release pin sleeve in a kit for installing or retrofitting to a shackle with threaded apertures.

FIG. 4 and FIG. 5 illustrate the present invention as a kit that is coupled to an existing shackle clevis or yoke in the field or during factory assembly.

In FIG. 4, a kit generally designated as 120 is illustrated. A shackle 122 as would be commonly manufactured or purchased, is shown in phantom and has left and right legs 124, 126 and left and right apertures 128, 130 of a predetermined diameter. Optional left and right set screw holes 132, 134 are shown in the bottom of legs 124, 126 and penetrate to left, right apertures 128, 130 respectively. A quick release pin assembly 40, as previously described in FIG. 1 through FIG. 3, is provided in kit 120.

Tubular quick release pin receiver 140 has distal end 142 and proximal end 144. Proximal end 144 has an outside diameter that tightly mates with left aperture 128. An optional groove 146 is shown on the outer circumference of quick release pin receiver 140 that can help seat distal end 144 in aperture 128. Distal end 142 has a larger outside diameter than proximal end 144. Quick release pin receiver 140 has retainer pin 148 and is configured to engage quick release pin assembly 40 as previously described in FIG. 3.

A tubular quick release pin bushing 150 has distal end 152, proximal end 154 and an outside diameter that tightly mates with right aperture 130. In one embodiment quick release pin bushing 150 has flange 156 on proximal end 154 and a groove 158 on the outside circumference. In one mode of this embodiment, left and right set screws 160, 162 are configured to mate with left and right set screw holes 132, 134 and engage groove 146 in quick release pin receiver 140 and groove 158 in quick release pin bushing 150 in left right apertures 128, 130 respectively. The inside diameter of quick release pin bushing 150 slidingly mates with quick release pin assembly 40. In one embodiment, quick release pin receiver 140 and quick release pin bushing 150 are inserted in shackle 122 with a press. In another embodiment, a metal adhesive or lock-tight material is used to secure quick release pin receiver 140 and quick release pin sleeve 150 in shackle 122. In a further embodiment, quick release pin receiver 140 and quick release pin bushing 150 are removably inserted in shackle 122 using set screws 160, 162. In a still further embodiment, right aperture 130 has an inner diameter that slidingly mates with the outer diameter of quick release pin assembly 40 and quick release pin bushing 150 is omitted from kit 120.

FIG. 5 illustrates a kit generally designated as 170. A shackle 172 as would be commonly manufactured or purchased, is shown in phantom and has left and right legs 174, 176 and left and right apertures 178, 180 of a predetermined diameter. Left, right apertures 178, 180 are adapted with female threads 182, 184 respectively. A quick release pin assembly 40, as previously described in FIG. 1 through FIG. 3, is provided in kit 170.

A tubular quick release pin receiver 190 has distal end 192 and proximal end 194. Proximal end 194 has an outside diameter with male threads 196 that mate with female threads 182 in left aperture 188. Distal end 192 of receiver 190 has a larger outside diameter than proximal end 194. Quick release pin receiver 190 has a retainer pin 198 inserted perpendicular to the axis of receiver 190 and is configured to engage a quick release pin assembly 40 as previously described in FIG. 3.

A tubular quick release pin bushing 200 has distal end 202 and proximal end 204 and has male threads 206 at distal end 202 that mate with female threads 184 in right aperture 180. In one mode, quick release pin bushing 200 has a flange 208 on proximal end 204 with an outer diameter larger than aperture 184. The inside diameter of quick release pin bushing 200 slidingly mates with a quick release pin assembly 40. In one embodiment, quick release pin receiver 190 and quick release pin bushing 200 are coupled to shackle 182 during factory assembly. In another embodiment, quick release pin receiver 190 and quick release pin bushing 200 are mounted to shackle 172 in the field. In a further embodiment, right aperture 190 has a non-threaded diameter that slidingly mates with the outer diameter of quick release pin assembly 40 and quick release pin bushing 200 is omitted from kit 170.

In a further embodiment, a non threaded quick release pin bushing 150, as shown in FIG. 4, is used with a threaded receiver 190 shown in FIG. 5 as a kit to adapt a shackle having one threaded aperture (not shown).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for securing a first object having a first aperture to a second object having second and third apertures, said apparatus comprising:
    an elongated cylindrical pin having distal and proximal ends;
    a tubular receiver adapted to receive said distal end of said pin;
    wherein said receiver is adapted to couple to the second object adjacent to and aligned with the third aperture;
    a retainer coupled to said receiver;
    means for engaging said retainer positioned at said distal end of said pin;
    wherein said means for engaging said retainer is further positioned within the circumference of said pin;
    means for biasing said pin positioned at said proximal end of said pin;
    wherein the first aperture of the first object is secured between the second and third apertures of the second object when said pin is positioned in the first, second, and third apertures, said means for engaging is engaged to said retainer, and said pin is biased against the second object by said means for biasing;
    wherein said pin has a mid proximal position between said distal end and said proximal end;
    wherein said pin has a large diameter from said distal end to said mid proximal position of said pin; and
    wherein said pin has a small diameter less than said large diameter from said mid proximal position to said proximal end of said pin; and
    wherein an annular shoulder is formed at said mid proximal position of said pin; wherein said means for engaging said retainer comprises a plurality of retainer slots, positioned in said distal end of said pin; wherein each said retainer slot is configured to form a continuous J slot having a long leg and a short leg; wherein said long leg of said J slot is aligned longitudinally with said pin; wherein said long leg of said J slot is open at said distal end of said pin; wherein said short leg of said J slot is configured to extend partially toward said distal end of said pin; wherein said J slot is further adapted to engage said retainer; and wherein said distal end of said pin engages said retainer when said short leg of said J slot is aligned with said retainer and said pin is biased against the second object by said means for biasing; wherein said receiver comprises a tubular receiver sleeve having distal and proximal ends; wherein said receiver sleeve is adapted to align with the third aperture of the second object; and wherein said proximal end of said receiver sleeve is adapted to couple to the second object.

2. An apparatus as recited in claim 1, wherein said distal end of said pin comprises a truncated cone.

3. An apparatus as recited in claim 1, wherein said means for biasing comprises:
    a tubular sliding sleeve configured to slide on said small diameter of said pin;
    said sliding sleeve having a distal end and a proximal end;
    said sliding sleeve further having an inner circumference and an outer circumference;
    wherein said distal end of said sliding sleeve has a ridge on the inner circumference;
    wherein said outer circumference of said sliding sleeve is greater than the inner circumference of the second aperture of the second object;
    wherein said ridge of said sliding sleeve is adapted to engage said annular shoulder of said pin;
    a tubular cap having a distal end, a mid proximal position and a proximal end;
    wherein said proximal end of said cap is adapted to couple to said proximal end of said pin;
    wherein said cap is further adapted to receive said sliding sleeve from said distal end to said mid proximal position of said cap;
    a spring adapted to fit said small diameter of said pin;
    wherein said spring is positioned within said inner circumference of said sliding sleeve;
    said spring having a distal end and a proximal end;
    wherein said distal end of said spring is positioned on said ridge of said sliding sleeve;
    wherein said proximal end of said spring is positioned on said mid proximal portion of said tubular cap; and
    wherein said spring is configured to bias said sliding sleeve distally on said pin.

4. An apparatus as recited in claim 1, wherein said retainer is a retainer pin positioned perpendicular to and intersecting the longitudinal axis of said receiver sleeve.

5. An apparatus as recited in claim 1, wherein said proximal end of said receiver sleeve is adapted to be welded to the second object.

6. An apparatus as recited in claim 1, wherein said proximal end of said sleeve is adapted to couple within the third aperture of the second object.

7. An apparatus as recited in claim 6, wherein:
    the third aperture of the second object is adapted with female threads;
    said proximal end of said receiver sleeve having male threads; and
    wherein said male threads are adapted to mate to said female threads.

8. An apparatus for securing an object having a first aperture, said apparatus comprising:
    a body having second and third apertures;
    wherein said second and third apertures of said body are adapted to align with the first aperture of the object when the object is positioned between said second and third apertures;
    said body further having a tubular receiver;

wherein said receiver is configured to align with said third aperture of said body;

a retainer coupled to said receiver;

an elongated cylindrical pin, said pin adapted to fit in said second and said third apertures of said body;

said pin having distal and proximal ends;

means for engaging said retainer positioned at said distal end of said pin;

said means for engaging further positioned within the circumference of said pin;

means for biasing said pin positioned at said proximal end of said pin;

wherein the first aperture of the object is secured between said second and third apertures of said body when said pin is positioned through the first, second, and third apertures, said means for engaging is engaged with said retainer, and said pin is biased against said body by said means for biasing;

wherein said pin has a mid proximal position between said distal end and said proximal end;

wherein said pin has a large diameter from said distal end to said mid proximal position of said pin; and wherein said pin has a small diameter less than said large diameter from said mid proximal position to said proximal end of said pin; and wherein an annular shoulder is formed at said mid proximal position of said pin; wherein said means for engaging said retainer comprises a plurality of retainer slots, positioned in said distal end of said pin; wherein each said retainer slot is configured to form a continuous J slot having a long leg and a short leg; wherein said long leg of said J slot is aligned longitudinally with said pin; wherein said long leg of said J slot is open at said distal end of said pin; wherein said short leg of said J slot is configured to extend partially toward said distal end of said pin; wherein said J slot is further adapted to engage said retainer; and wherein said distal end of said pin engages said retainer when said short leg of said J slot is aligned with said retainer and said pin is biased against said body by said means for biasing; wherein said receiver comprises a tubular receiver sleeve having distal and proximal ends; wherein said receiver sleeve is adapted to align with said third aperture of said body; and wherein said proximal end of said receiver sleeve is coupled to said body.

9. An apparatus as recited in claim 8, wherein said distal end of said pin comprises a truncated cone.

10. An apparatus as recited in claim 8, wherein said means for biasing comprises:

a tubular sliding sleeve configured to slide on said small diameter of said pin;

wherein said sliding sleeve has distal and proximal ends;

wherein said sliding sleeve further has an inner circumference and an outer circumference;

wherein said distal end of said sliding sleeve has a ridge on said inner circumference;

wherein said outer circumference of said sliding sleeve is greater than the circumference of said second aperture;

wherein said ridge of said sliding sleeve is adapted to engage said shoulder of said pin;

a tubular cap having a distal end, a mid proximal position and a proximal end;

wherein said proximal end of said cap is adapted to couple to said proximal end of said pin;

wherein said cap is further adapted to receive said sliding sleeve from said distal end to said mid proximal position of said cap;

a spring adapted to fit said small diameter of said pin;

said spring positioned within said inner circumference of said sliding sleeve;

said spring having distal and proximal ends;

said distal end of said spring positioned on said ridge of said sliding sleeve;

said proximal end of said spring positioned on said mid proximal portion of said tubular cap;

wherein said spring is configured to bias said sliding sleeve distally on said pin.

11. An apparatus as recited in claim 8, wherein said retainer is a retainer pin positioned perpendicular to and intersecting the longitudinal axis of said receiver sleeve.

12. An apparatus as recited in claim 8, wherein said proximal end of said receiver sleeve is welded to said body.

13. An apparatus as recited in claim 8, wherein said proximal end of said receiver sleeve is adapted to couple within said third aperture of said body.

14. An apparatus for securing an object as recited in claim 13, wherein:

said third aperture of said body is adapted with female threads;

said proximal end of said receiver sleeve having male threads; and wherein said male threads are adapted to mate to said female threads.

15. An apparatus as recited in claim 8, wherein said receiver and said body are manufactured as a single structure.

16. An apparatus as recited in claim 8, wherein said body is selected from the group consisting of a shackle, a clevis, a yoke, and a forked rod end.

17. An apparatus for securing an object having a first aperture, said apparatus comprising:

a body having second and third apertures;

wherein said second and third apertures of said body are adapted to align with the first aperture of the object when the object is positioned between said second and third apertures;

a tubular receiver coupled to said body;

wherein said receiver is configured to align with said third aperture of said body;

a retainer coupled to said receiver;

an elongated cylindrical pin, said pin adapted to fit in said second and said third apertures of said body;

said pin having distal and proximal ends;

a plurality of open ended J shaped slots positioned at said distal end of said pin;

said J shaped slots configured to engage said retainer when said pin is advanced distally in said receiver and rotated through an angle less than 180 degrees;

a spring positioned near said proximal end of said pin;

wherein the first aperture of the object is secured between said second and third apertures of said body when said pin is positioned through the first, second, and third apertures, said J shaped slots are engaged with said retainer in said receiver, and said spring is biased between said proximal end of said pin and said body;

wherein said pin has a mid proximal position between said distal end and said proximal end;

wherein said pin has a large diameter from said distal end to said mid proximal position of said pin; and wherein said pin has a small diameter less than said large diameter from said mid proximal position to said proximal end of said pin; and wherein an annular shoulder is formed at said mid proximal position of said pin.

18. An apparatus as recited in claim 17, wherein said retainer is a retainer pin positioned perpendicular to and intersecting the longitudinal axis of said receiver sleeve.

19. An apparatus as recited in claim 17, wherein:
a bore extends longitudinally and partially through said distal end of said pin, thereby forming a distal tube; and
said plurality of J shaped slots comprises two.

20. An apparatus as recited in claim 17, further comprising:
a sliding sleeve positioned near said proximal end of said pin;
wherein said sliding sleeve is biased against said body by said spring when said J shaped slots are engaged with said retainer.

21. An apparatus as recited in claim 17, wherein:
said third aperture of said body is adapted with female threads;
said receiver having male threads; and
wherein said male threads are adapted to mate to said female threads.

22. An apparatus as recited in claim 17, wherein said receiver and said body are manufactured as a single structure.

23. A pin securing system kit for mounting to an object having first and second apertures, the kit comprising:
a tubular receiver having distal and proximal ends;
said proximal end of said receiver adapted to couple to the object;
said receiver further adapted to align with the second aperture of the object;
a retainer coupled to said receiver;
an elongated cylindrical pin, said pin adapted to slidingly fit in the first and second aligned apertures of the object;
said pin having distal and proximal ends;
a plurality of retainer slots, positioned in said distal end of said pin;
wherein each said retainer slot is configured to form a continuous J slot having a long leg and a short leg;
wherein said long leg of said J slot is aligned longitudinally with said pin;
wherein said long leg of said J slot is open at said distal end of said pin;
wherein said short leg of said J slot is configured to extend partially toward said distal end of said pin;
wherein said J slot is further adapted to engage said retainer;
a spring positioned near said proximal end of said pin;
wherein said distal end of said pin is engaged with said retainer when said short leg of said J slot is aligned with said retainer and said spring is biased between said proximal end of said pin and the object;
said pin further having a mid proximal position between said distal end and said proximal end;
said pin having a large diameter from said distal end to said mid proximal position;
said pin having a small diameter less than said large diameter extending from said mid proximal position to said proximal end;
wherein an annular shoulder is formed at said mid proximal position of said pin;
a tubular sliding sleeve configured to slide on said small diameter of said pin;
said sliding sleeve having a distal end and a proximal end;
said sliding sleeve further having an inner circumference and an outer circumference;
wherein said outer circumference of said sliding sleeve is greater than the inner circumference of the first aperture of the object;
said distal end of said sliding sleeve having a ridge on said inner circumference;
said ridge of said sliding sleeve adapted to engage said annular shoulder of said pin;
a tubular cap having a distal end, a mid proximal position and a proximal end;
said proximal end of said cap adapted to couple to said proximal end of said pin;
said cap further adapted to accommodate said sliding sleeve from said distal end to said mid proximal position of said cap;
said spring adapted to fit said small diameter of said pin;
said spring positioned within said inner circumference of said sliding sleeve;
said spring having a distal end and a proximal end;
said distal end of said spring positioned on said ridge of said sliding sleeve;
said proximal end of said spring positioned on said mid proximal portion of said tubular cap; and
wherein said spring is configured to bias said sliding sleeve distally on said pin.

24. A kit as recited in claim 23, further comprising:
a bushing having an inner circumference and an outer circumference;
wherein said outer circumference of said bushing is adapted to fit tightly within the first aperture;
wherein said inner circumference of said bushing is further adapted to receive said pin; and
wherein said inner circumference of said bushing is further adapted to be smaller than the outer circumference of said sliding sleeve.

25. A kit as recited in claim 24, wherein:
the first aperture of the object is adapted with female threads;
said bushing having male threads; and
wherein said male threads are adapted to mate to said female threads.

26. A kit as recited in claim 23, wherein said receiver comprises:
a receiver sleeve with distal and proximal ends;
said proximal end of said receiver sleeve adapted to couple to the object.

27. A kit as recited in claim 26, wherein said retainer is a retainer pin positioned perpendicular to and intersecting the longitudinal axis of said receiver sleeve.

28. A kit as recited in claim 26, wherein said proximal end of said receiver sleeve is adapted to be welded to the object.

29. A kit as recited in claim 26, wherein said proximal end of said receiver sleeve is adapted to couple within the second aperture of the object.

30. A kit as recited in claim 29, wherein:
the second aperture of the object is adapted with female threads;
said receiver sleeve having male threads; and
wherein said male threads are adapted to mate to said female threads.

31. In an apparatus having first and second apertures configured to receive a pin, the improvement comprising:
a tubular receiver having at least a proximal end, said proximal end adapted to couple to the apparatus;
wherein said receiver is further adapted to align with the second aperture of the apparatus;
a retainer coupled to said receiver;
an elongated cylindrical pin, said pin adapted to slidingly fit in the first and second aligned apertures of the apparatus;

said pin having distal and proximal ends;
a plurality of retainer slots, positioned in said distal end of said pin;
wherein each said retainer slot is configured to form a continuous J slot having a long leg and a short leg;
wherein said long leg of said J slot is aligned longitudinally with said pin;
wherein said long leg of said J slot is open at said distal end of said pin;
wherein said short leg of said J slot is configured to extend partially toward said distal end of said pin;
wherein said J slot is further adapted to engage said retainer;
a spring positioned near said proximal end of said pin;
wherein said distal end of said pin is engaged with said retainer when said short legs of said J slot is aligned with said retainer and said spring is biased between the apparatus and the proximal end of said pin;
said pin further having a mid proximal position between said distal end and said proximal end;
said pin having a large diameter from said distal end to said mid proximal position;
said pin having a small diameter less than said large diameter extending from said mid proximal position to said proximal end;
wherein an annular shoulder is formed at said mid proximal position of said pin;
a tubular sliding sleeve configured to slide on said small diameter of said pin;
said sliding sleeve having distal and proximal ends;
said sliding sleeve further having an inner circumference and an outer circumference;
wherein said outer circumference of said sliding sleeve is greater than the inner circumference of the first aperture;
said distal end of said sliding sleeve having a ridge on said inner circumference;
said ridge of said sliding sleeve adapted to engage said annular shoulder of said pin;
a tubular cap having a distal end, a mid proximal position and a proximal end;
said proximal end of said cap adapted to couple to said proximal end of said pin;
said cap further adapted to accommodate said sliding sleeve from said distal end to said mid proximal position of said cap;
said spring adapted to fit said small diameter of said pin;
said spring positioned within said inner circumference of said sliding sleeve;
said spring having a distal end and a proximal end;
said distal end of said spring positioned on said ridge of said sliding sleeve;
said proximal end of said spring positioned on said mid proximal portion of said tubular cap; and
wherein said spring is configured to bias said sliding sleeve distally on said pin.

32. In an apparatus as recited in claim 31, the improvement further comprising:
a bushing having an inner circumference and an outer circumference;
said outer circumference of said bushing adapted to couple within the first aperture;
said inner circumference of said bushing adapted to receive said pin;
said inner circumference of said bushing further adapted to be smaller than the outer circumference of said slide sleeve.

33. In an apparatus as recited in claim 32, the improvement further comprising:
wherein the first aperture of the apparatus is adapted with female threads;
said bushing having male threads; and
wherein said male threads are adapted to mate to said female threads.

34. In an apparatus as recited in claim 31, the improvement further comprising:
a receiver sleeve with distal and proximal ends;
wherein said proximal end of said receiver sleeve is adapted to couple to the apparatus.

35. In an apparatus as recited in claim 34, said retainer further comprising a retainer pin positioned perpendicular to and intersecting the longitudinal axis of said receiver sleeve.

36. In an apparatus as recited in claim 34, the improvement further comprising said proximal end of said receiver sleeve adapted to be welded to the apparatus.

37. In an apparatus as recited in claim 34, the improvement further comprising said proximal end of said receiver sleeve adapted to couple within the second aperture of the apparatus.

38. In an apparatus as recited in claim 34, the improvement further comprising:
the second aperture of the apparatus adapted with female threads;
said receiver sleeve having male threads; and
wherein said male threads are adapted to mate to said female threads.

39. In an apparatus as recited in claim 31, the improvement is adapted to couple to an apparatus selected from the group consisting of a shackle, a clevis, a yoke, and a forked rod end.

* * * * *